United States Patent Office 3,784,500
Patented Jan. 8, 1974

3,784,500
HALOGENATED EPOXIDES
Carl L. Gibbons, Midland, Mich., assignor to The Dow Chemical Company, Midland, Mich.
No Drawing. Continuation-in-part of application Ser. No. 74,205, Sept. 21, 1970, now Patent No. 3,674,812. This application Apr. 20, 1972, Ser. No. 245,751
Int. Cl. C08f 45/32, 45/60
U.S. Cl. 260—30.4 R                                10 Claims

ABSTRACT OF THE DISCLOSURE

Trihaloneopentyl alcohol is reacted with epihalohydrin and then with base to give an adduct of the formula

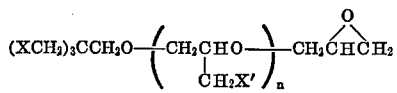

where each X and X' is independently Br or Cl and $n$ is an integer of 0 to about 10. Such compounds are useful as plasticizers for polyvinyl chloride, as fire retardants for polyesters and as intermediates.

CROSS-REFERENCE TO OTHER APPLICATIONS

This is a continuation-in-part of pending U.S. patent application Ser. No. 74,205, filed Sept. 21, 1970, now U.S. Pat. No. 3,674,812.

BACKGROUND OF THE INVENTION

Halogenated epoxides are well known in the art, especially those epoxides obtained from epichlorohydrin. The compounds of the present invention, however, are not known and their unusual properties could not have been predicted from the art.

Plasticizers for polyvinyl chloride have been continuously sought, especially those plasticizers which lend fire retardancy to polyvinyl chloride rather than deleteriously affect the fire retardancy of the resultant product. This search along with a search for a suitable fire retardant for polyesters has spurred research to find suitable compounds which have desirable properties to fulfill either of these needs.

Polyepihalohydrins have been employed as additives in acrylonitrile polymer along with other substances such as calcium phosphates and antimony oxide, see Lowes in U.S. 3,271,343 and U.S. 3,271,344. Such combinations gave films that were fire retardant.

SUMMARY OF THE INVENTION

According to the present invention, new halogenated epoxides of the general formula

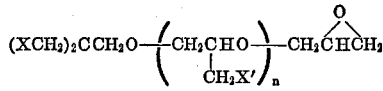

where each X and X' is independently Br or Cl and $n$ is an integer of 0 to about 10 have been discovered. Such compounds are good plasticizers for polyvinyl chloride and are suitable fire retardants for polyesters.

The compounds contemplated by the invention are any of those which fit the general formula above. Preferred compounds of the invention are those wherein each X is Br and those compounds wherein each X' is Cl. Especially preferred are those compounds wherein each X is Br and each X' is Cl and those compounds wherein $n$ is an integer of 0 to 5. Referring to specific compounds, those of special interest in the present invention have an $n$ of 0 and an $n$ of 1, respectively.

The compounds of the invention are prepared by reacting the appropriate bromo, chloro or bromochloroneopentyl alcohol with epichlorohyrin, epibromohydrin or mixtures thereof in the presence of a Lewis acid catalyst as the first step. When this reaction is complete, the product is reacted in a second step with caustic or other suitable base to produce the terminal epoxide. Both reactions are well known and are conducted in the ordinary manner as exemplified in the specific embodiments.

The products of the invention are colorless high boiling liquids. Generally rather than obtaining one specific compound in the reaction, a mixture of compounds varying in the value of $n$ is obtained. The adducts of the present invention are freely soluble in many organic solvents such as acetone, methylene chloride, ethylene dichloride, chloroform, carbon tetrachloride, benzene, methanol and toluene.

Many vinyl chloride polymers are classified as nonburning because of their high chlorine content. Of these, polyvinyl chloride (PVC) is the most widely used. The major use of PVC, however, is in plasticized compositions where the plasticizer is used in amounts ranging up to greater than 100 parts of plasticizer per 100 parts of PVC. This greatly increases the flammability of the resin, often to hazardous levels. An important aspect of performance is the physical properties of the plasticized vinyl composition. These properties include compatibility, volatility, tensile strength, elongation, modulus at 100% elongation and hardness among others as well as such properties as low migration and low extractability.

The halogenated epoxides of the invention, especially those where $n$ is less than 5, are useful plasticizers for polyvinyl chloride to give a fire retardant product. They are also useful and compatible fire retardants for polyesters. These compounds are also especially intermediates for preparing ethers of compounds containing an active hydrogen such as polyglycols, and they may be hydrolyzed to give halogenated glycols.

As indicated, the halogenated epoxides described herein can be used to plasticize PVC without increasing its flammability. They can also be used in mixtures with flammable plasticizers to serve as flame retardants. Further, they can be combined with polyesters to produce a fire retardant polymer.

The compounds are stable to thermal and ultraviolet light degradation. In addition, the epoxy functionality is capable of enhancing the thermal stability of PVC, especially when used in conjunction with metallic thermal stabilizers.

As noted above, this new fire retardant plasticizer can be added to the polymer either alone or in combination with nonhalogen containing plasticizers. The additive of the invention will be more effective with some combinations that it is with other, but the desired effect can be obtained by proper adjustment of the fire retardant concentration in the polymer.

Suitable vinyl chloride polymers are herein defined to include homopolymers and copolymers in which vinyl chloride is the major constituent wherein such copolymers contain at least 50 weight percent of vinyl chloride. The preferred vinyl chloride polymers are those which contain 70 weight percent or more vinyl chloride. Especially preferred is polyvinyl chloride (PVC) because of its demonstrated effectiveness in the invention.

The fire retardant plasticizer is physically incorporated into the vinyl chloride polymer by mixing or dissolving, along with any other desired plasticizer. The polymer is then processed in its normal manner to give the desired end product.

The amount of the fire retardant plasticizer incorporated in the composition varies widely and is dependent upon the fire retardancy wanted, and the desired physical properties of the plasticized vinyl composition. Generally, however, then the products of the present invention are used alone with the vinyl chloride polymer, i.e., in the absence of other plasticizers, a desirable composition has about 5 to about 100 parts by weight of the halogenated epoxide, with amounts of about 40 to about 80 parts by weight being preferred. When a nonhalogenated plasticizer is introduced into the vinyl chloride polymer along with the products of the present invention, a desirable composition has about 10 to about 70 parts by weight of the nonhalogenated plasticizer and about 10 to about 90 parts by weight of the halogenated epoxide, with the combined parts by weight of the two plasticizers comprising less than about 120 parts by weight, all parts by weight based on 100 parts by weight of the vinyl chloride polymer.

Of course, as the amount of the fire retardant plasticizer in the composition is increased, the properties of the resultant product are altered. By the use of the halogenated epoxides of the present invention, however, desirable fire retardant plasticized compositions can be prepared without materially affecting the other desirable properties of the polymer. Also, the fire retardancy per part by weight of these ethers will depend on the particular halogenated epoxide employed.

It is to be understood that the particular halogenated epoxides can be used singly or in combination with each other.

The nonhalogenated plasticizers, if used, can be any of the many polymeric plasticizers available which are formed by reacting alcohols or glycols with saturated dicarboxylic acids, or simple esters such as di(2-ethylhexyl) phthalate (DOP). As indicated, most commercial polymeric plasticizers are linear saturated polyesters using dibasic acids such as adipic, azelaic, sebacic and the like. However, ring structure acids such as the three isomers of phthalic acid can also be used in mixture with the linear acids. The dibacic acids can be reacted with a variety of diols and the average molecular weight of such plasticizers can range from 700 to over 10,000. Some of the very high molecular weight polyesters are hydroxyl terminated. However, most polyesters are terminated with long chain monobasic acids or monohydric alcohols. A typical commercial product might be $n=12$ polyester made from propylene glycol (propanediol-1,2) and adipic acid with lauric acid as the terminator. The "$n$" number herein, refers to the number of repeating units, in this case monoesters of propylene glycol and adipic acid in the polyester molecule. Where hydroxyl termination is employed, the structure may be reprsented as follows where A is a dibasic acid and G a diol:

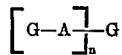

Similarly, a polyester terminated with a monobasic acid (L) may be represented as:

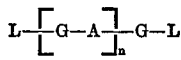

and one terminated with a monohydric alcohol (H) as:

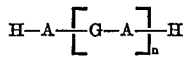

Such plasticizers can include the esters and polyesters of di-n-hexyl azelate, diethylene glycol dipelargonate, diisooctyl azelate, di-2-ethylhexyl azelate, tetrahydrofurfuryl oleate, triethylene glycol dipelargonate and the like. Others are triisodecyl trimellitate, diphenyl phthalate and dicyclohexyl phthalate. Many such plasticizers are mixtures of various such esters and polyesters.

Plasticizers containing the epoxy group

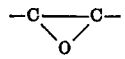

such as epoxidized soybean oil, linseed oil and epoxy stearates may also be used as plasticizers. Compatibility is best with the highest level of epoxidation and minimum hydroxyl content. Epoxidized soybean oil and linseed oil are high in molecular weight and thus possess low volatility and good resistance to extraction. Esters of epoxy stearate, such as octyl and butyl epoxy stearate, are lower in molecular weight and consequently quite volatile; but they contribute low temperature properties. Epoxy tallates such as octyl epoxy tallate exhibit good low temperature properties in addition to heat and light stability, which combination of properties lends itself handily to auto upholstery.

SPECIFIC EMBODIMENTS

Example 1

To a reactor was charged 1624 g. (5 moles) of tribromoneopentyl alcohol, 1500 ml. of ethylene dichloride and 7.5 ml. of anhydrous stannic chloride. The reactor and contents were heated to 80° C. with stirring. 482 g. (5.2 m.) of epichlorohydrin was added dropwise with stirring over a period of 1 hour using the reaction exotherm to maintain the temperature at 82° to 85° C. At the termination of the addition of epichlorohydrin, the solution was stirred at 82° C. for 20 minutes. This solution was cooled to 70° C. and then treated with 10 moles of sodium hydroxide dissolved in 1200 ml. of water. The 2 phase system was stirred vigorously at 75° C. for 40 hours. The organic phase was separated, washed with water until neutral and dried over magnesium sulfate. The product was stripped of solvent and by-products by vacuum distillation. The crude product was a pale yellow liquid weighing 1240 g. The mixture was analyzed as described by Jay, in Analytical Chemistry 36, 667 (1964) to have an epoxy equivalent weight of 467 and by neutron activation analysis the product was analyzed to contain 53.6% by weight Br and 6.1% by weight Cl. The mixture in a differential thermal analysis showed exothermic decomposition at 330° to 345° C. In thermal gravimetric analysis where the sample is gradually heated, the mixture lost weight from 150° to 325° C., with 50% weight loss at 250° C.

Example 2

A mixture of the product of Example 1 containing approximately equal weight percentages of

and

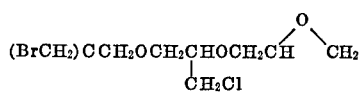

was blended with polyvinyl chloride sold under the trade designation PVC-2103 at a level of 90 parts per hundred of resin. The blending was done in a Brabender mixer at 150° C. for 5 minutes at a speed of 60 r.p.m. The material was then molded at a temperature of 150° C. and a pressure of 20,000 p.s.i. for 4 minutes. The final product was transparent and had a flexibility roughly equivalent to that obtained by plasticizing the same resin with 60 parts per hundred of dioctyl phthalate in the same manner. The finished product containing the halogenated epoxide exhibited a high degree of flame retardancy and was self-extinguishing when ignited with a match or a Bunsen burner flame. A sample of the product had a limiting oxygen index (LOI) as described in Combustion and Flame, 10, 135 (1966) of 0.400 as compared to an LOI of 0.225 for the product plasticized with a dioctyl phthalate.

Example 3

In the same manner as described by Example 2, a formulation containing 1 part by weight of the halogenated epoxide plasticizer of Example 1 and 1 part by weight of dioctyl phthalate was blended and molded with polyvinyl chloride as shown in Example 2 at a concentration of 60 parts per hundred to give a transparent material of slightly lower flexibility than the resin plasticized only with the dioctyl phthalate at the same level. This material was also self-extinguishing and had an LOI of 0.280.

Example 4

A polyester resin was prepared by reacting 268 g. of maleic anhydride, 405 g. of phthalic anhydride, 320 g. of propylene glycol and 680 g. of the mixture of glycidyl ethers of tribromoneopentyl alcohol prepared in Example 1. The components described above were mixed and reacted at a temperature of 190° C. for 11 hours at atmospheric pressure. The product was diluted with 30% by weight styrene monomer and cooked in the presence of 1% of benzoyl peroxide at a temperature of 180° F. to give a clear resin containing 15% by weight bromine. The polyester resin had an LOI of 0.247 and had physical properties similar to a polyester without the halogenated epoxide.

Example 5

In the same manner as shown in Example 1, two molar equivalents of epichlorohydrin was reacted with tribromoneopentyl alcohol to give a mixture of compounds of the general formula where each X was Br, each X' was Cl and $n$ had an average value of about 1.2. This compound was tested as shown in Example 2 and found to be a suitable plasticizer for polyvinyl chloride.

Example 6

In the same manner as shown in Example 5, five molar equivalents of epichlorohydrin was reacted with tribromoneopentyl alcohol to give a product where the average value of $n$ was about 4. This mixture was tested as a plasticizer for polyvinyl chloride and found to give a flexible but stiffer product than that of Example 5.

Example 7

A halogenated epoxide plasticizer of the present invention was prepared wherein each X was bromine, each X' was chlorine and $n$ was an average of about 0.8. This product was incorporated into polyvinyl chloride (Dow PVC-2103) having a solution viscosity of 1.90-2.05 cps. measured in a 2% o-dichlorobenzene and having an inherent viscosity of 0.95-1.0. Samples were compounded in a Brabender mixer at a temperature of 150°-160° C. for 3-4 minutes, with some samples having mixed therewith dioctyl phthalate (DOP). Test samples were molded in a compression press at 170°-180° C. under 800-900 p.s.i. pressure for three minutes and then stamped or cut from the compressed sheet. The flammability as determined by ASTM D-2863 (LOI) of these samples are shown in Table I.

TABLE I

| Parts by weight | | | |
|---|---|---|---|
| PVC | DOP | Halogenated epoxide | ASTM D-2683 (LOI) |
| 100 | 60 | 0 | 0.226 |
| 100 | 30 | 30 | 0.280 |
| 100 | 30 | 90 | 0.400 |

Example 8

A halogenated epoxide of the present invention wherein each X was bromine, each X' was chloride and $n$ had an average of 1.8 was incorporated into PVC as in Example 7 above. Three parts per hundred (phr.) of a thermal stabilizer (Ferro 1825) was used. The physical properties of this epoxide were compared to those of various halogenated and nonhalogenated plasticizers. ASTM Method D-412 (20 inches/minute grip separation) was used to determine and compare the properties. At 62.5 phr. of plasticizer level, the halogenated epoxide had a tensile strength of 2928 p.s.i., a percent elongation of 254, a modulus at 100% elongation of 2220 and a Shore A hardness of 92. The hardness properties of PVC plasticized with the several other plasticizers are listed below:

TABLE II

Shore A Hardness of various plasticizers [1]

| Plasticizer | Parts per hundred (phr.) | Shore A Hardness |
|---|---|---|
| Chlorinated biphenyl (48% Cl) | 67 | 94 |
| Chlorinated biphenyl (54% Cl) | 67 | 100+ |
| Chlorinated paraffin (52% Cl) | 67 | 79 |
| DOP | 67 | 75 |
| Triisodecyl trimellitate | 67 | 87 |
| Diphenyl phthalate | 67 | 97 |
| Dicyclohexyl phthalate | 67 | 99 |

[1] J. R. Darby and J. K. Sears, "Kirk-Othmer Encyclopedia of Chemical Technology," vol. 15, ed. 2.

Example 9

The halogenated epoxide of Example 8, above, was mixed with DOP and antimony oxide synergist in varying amounts and checked for flammability. The samples were unstabilized and compounded and molded as in Examples 7 and 8, above.

TABLE III

| Parts based on 100 parts PVC | | | |
|---|---|---|---|
| DOP | Halogenated epoxide | Antimony oxide | ASTM D-2863 (LOI) |
| 60 | 0 | 1 | 0.240 |
| 60 | 0 | 2 | 0.235 |
| 50 | 10 | 1 | 0.250 |
| 50 | 10 | 2 | 0.260 |
| 40 | 20 | 1 | 0.275 |
| 40 | 20 | 2 | 0.280 |

Example 10

The halogenated epoxide of Example 8 was then blended with PVC and varying amounts of DOP and Ferrocene synergist and the flammibility determined as shown in Table IV, below:

TABLE IV

| Parts based on 100 parts PVC | | | |
|---|---|---|---|
| DOP | Halogenated epoxide | Ferrocene | ASTM D-2863 (LOI) |
| 60 | 0 | 0.16 | 0.252 |
| 60 | 0 | 0.80 | 0.248 |
| 50 | 10 | 0.16 | 0.260 |
| 50 | 10 | 0.80 | 0.280 |
| 40 | 20 | 0.16 | 0.285 |
| 40 | 20 | 0.80 | 0.285 |

Example 11

The halogenated epoxide of Example 8 was then mixed with cresyl diphenyl phosphate, antimony oxide and dioctyl phthalate mixtures and tested for flammability:

TABLE V

| Parts based on 100 parts PVC | | | | |
|---|---|---|---|---|
| DOP | Cresyl diphenyl phosphate | Halogenated epoxide | Antimony oxide | ASTM D-2863 (LOI) |
| 40 | 15 | 5 | 0 | 0.255 |
| 40 | 5 | 15 | 0 | 0.263 |
| 40 | 15 | 5 | 1 | 0.268 |
| 40 | 5 | 15 | 1 | 0.265 |

Similarly, 10 parts of epoxidized soybean oil and 15 parts of the halogenated epoxide of Example 8 are blended into PVC based on 100 parts of the PVC, along with a barium carboxylate stabilizer to produce a fire resistant flexible vinyl.

In the same manner as described by Example 1 other compounds of the general formula are prepared by reacting tribromoneopentyl alcohol, trichloroneopentyl alcohol, or chlorobromoneopentyl alcohol with epichlorohydrin, epibromohydrin or mixture thereof in the presence of a Lewis Acid catalyst. These halogenated and mixed halogenated alcohols are known. For example, the preparation of the mixed variety is outlined in F. Govaert and M. Beyaert, Natuurw. Tijdschr., 22, 73–4 (1940); C.A. 37, 3054[8] (1943); they are referred to in The Pentaerythritols, E. Berlow, R. H. Barth, J. E. Snow, Reinhold Publishing Co., New York, N.Y. (1958) at page 106. Representative examples of such compounds include:

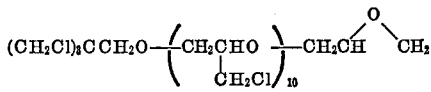

which is prepared by reacting trichloroneopentyl alcohol with about 11 moles of epichlorohydrin in the presence of stannic chloride and then reacting one mole of aqueous NaOH per mole of hydroxyl in the resultant product.

Other representative compounds include:

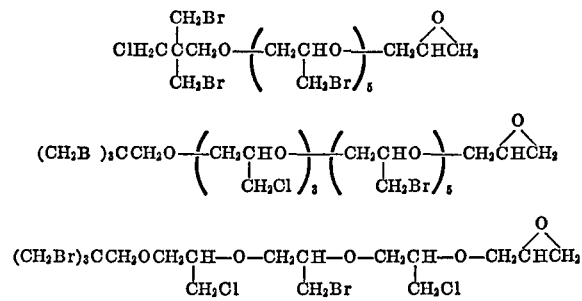

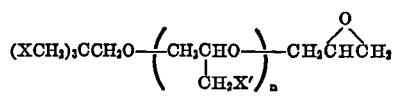

These compounds are suitable plasticizers, fire retardants and intermediates as described above.

It is to be understood that other additives in minor amounts, such as thermal stabilizers, terminators and the like, may be employed without departing from the scope of the present invention. Likewise, the enhancement of the fire retardancy of the polymers of the present invention by the addition of other known fire retardants such an antimony oxide, phosphate compounds, other halogen-containing materials and the like is contemplated herein.

I claim:

1. A composition of matter comprising a vinyl chloride polymer containing as the fire retardant plasticizer an effective amount of a compound of the formula $$(XCH_2)_3CCH_2O-\left(CH_2CHO-\underset{CH_2X'}{\vert}\right)_n-CH_2\overset{O}{\overset{\triangle}{C}HCH_2}$$

where each X and X' is independently Br or Cl and $n$ is an integer of 0 to about 10.

2. The composition of matter of claim 1 wherein each X of the fire retardant plasticizer is Br.

3. The composition of matter of claim 1 wherein, in the fire retardant plasticizer, each X is Br, each X' is Cl and $n$ is an integer of 0 to about 4.

4. The composition of matter of claim 1 wherein the vinyl chloride polymer is polyvinyl chloride.

5. The composition of matter of claim 1 wherein the fire retardant plasticizer is from about 5 to about 100 parts by weight based on 100 parts by weight of the vinyl chloride polymer.

6. The composition of matter of claim 1 wherein the fire retardant plasticizer is from about 40 to about 80 parts by weight based on 100 parts by weight of the vinyl chloride polymer.

7. A composition of matter comprising a vinyl chloride polymer containing effective amounts of (a) a fire retardant plasticizer of the formula

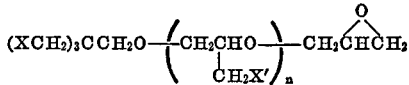

where each X and X' is independently Br or Cl and $n$ is an integer of 0 to about 10 and (b) a nonhalogenated, saturated polyester, ester or epoxy plasticizer.

8. The composition of matter of claim 7 wherein, in the fire retardant plasticizer, each X is Br, each X' is Cl and $n$ is an integer of 0 to about 4.

9. The composition of matter of claim 7 wherein (a) comprises from about 10 to about 90 parts by weight based on 100 parts by weight of the vinyl chloride polymer and (b) comprises from about 10 to about 70 parts by weight based on 100 parts by weight of the vinyl chloride polymer, the combined parts by weight of (a) and (b) comprising less than about 120 parts by weight based on 100 parts by weight of the vinyl chloride polymer.

10. The composition of matter of claim 7 wherein the vinyl chloride polymer is polyvinyl chloride.

References Cited
UNITED STATES PATENTS 3,590,009   6/1971   Gurgiolo et al. _____ 260—2

ALLAN LIEBERMAN, Primary Examiner

J. H. DERRINGTON, Assistant Examiner

U.S. Cl. X.R.

260—23 X A, 28.5 D, 45.75 R, 45.8 A, 75 EP, 348 R